United States Patent [19]

Plamondon

[11] 4,260,038

[45] Apr. 7, 1981

[54] FOLDING SAWHORSE FRAME

[76] Inventor: Lawrence J. Plamondon, Site 2, Box 16, St. Front, Saskatchewan, (Via Rose Valley), Canada

[21] Appl. No.: 56,885

[22] Filed: Jul. 12, 1979

[30] Foreign Application Priority Data

Feb. 28, 1979 [CA] Canada .................................. 322472

[51] Int. Cl.³ ............................................. F16M 11/24

[52] U.S. Cl. .................................... 182/155; 182/184; 182/225

[58] Field of Search ............... 182/153, 155, 181, 182, 182/183, 184, 185, 225, 224; 248/166, 188.6

[56] References Cited

U.S. PATENT DOCUMENTS

| | | | |
|---|---|---|---|
| 416,544 | 12/1889 | Banks | 182/155 |
| 462,581 | 11/1891 | Peck | 182/185 |
| 3,637,045 | 1/1972 | Poffenbaugh | 182/155 |

*Primary Examiner*—Reinaldo P. Machado
*Attorney, Agent, or Firm*—Stanley G. Ade

[57] ABSTRACT

A pair of triangular supports are provided with cross member sockets on the upper ends thereof. A cross bar extends between the end supports and is pivoted to each so that they can be folded downwardly upon the cross bar for storage. Braces are pivoted by the lower ends thereof to the cross bar and are pinned to the end supports when same are erected. A wooden beam or the like then engages the sockets to form the complete sawhorse.

3 Claims, 6 Drawing Figures

FOLDING SAWHORSE FRAME

BACKGROUND OF THE INVENTION

This invention relates to new and useful improvements in folding sawhorse frames. Conventionally, pairs of brackets are supplied in which wooden members are socketed to form the end members and a wooden cross member then extends between the two end members to form the completed sawhorse. When dismantled, they comprise several individual components which are easily mislaid and are difficult to transport and store. Folding sawhorses have been provided heretofore, but these are extremely involved and relatively expensive to manufacture as well as being unsteady when erected.

SUMMARY OF THE INVENTION

The present invention overcomes these disadvantages and one aspect of the invention consists of a sawhorse frame comprising in combination a pair of end components, member engaging means on the upper end of each of said end components, a main brace member extending between said end components and maintaining same in spaced apart relationship, said main brace member being hingedly connected to said end components whereby said end components can be moved from a folded, upper end to upper end, position upon said brace member, to an erect, spaced and parallel position, one at each end of said brace member and vice-versa and detachable struts extending between said end components and said brace member when in the erected position to maintain said sawhorse frame in the erect position.

This enables the complete sawhorse to consist of two portions, one the frame which folds down to a relatively small size and the second, the 2"×4" extending therebetween when the sawhorse frame is erected.

Another advantage of the invention is to provide a device which can be used as a carpenter's sawhorse, as a scaffold, may have added extension on the legs to adjust the height and can be used as a makeshift support for a picnic table, welding bench or the like.

Another advantage of the invention is to provide a sawhorse frame which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
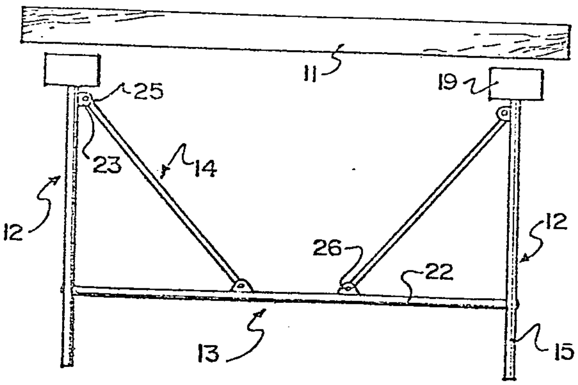
FIG. 1 is a side elevation of a sawhorse in the erected position and with the cross beam spaced above the member engaging channels.

Proceeding therefore to describe the invention in detail, the sawhorse comprises a sawhorse frame collectively designated 10 to which is detachably engaged a support member 11 which normally takes the form of a length of lumber having dimensions generally known as 2"×4". However, it will be appreciated that other sizes of lumber can be used, if desired.

The sawhorse frame comprises a pair of end components collectively designated 12 and a main brace member extending therebetween collectively designated 13 with detachable struts collectively designated 14 extending therebetween as will hereinafter be described.

Figure 3:
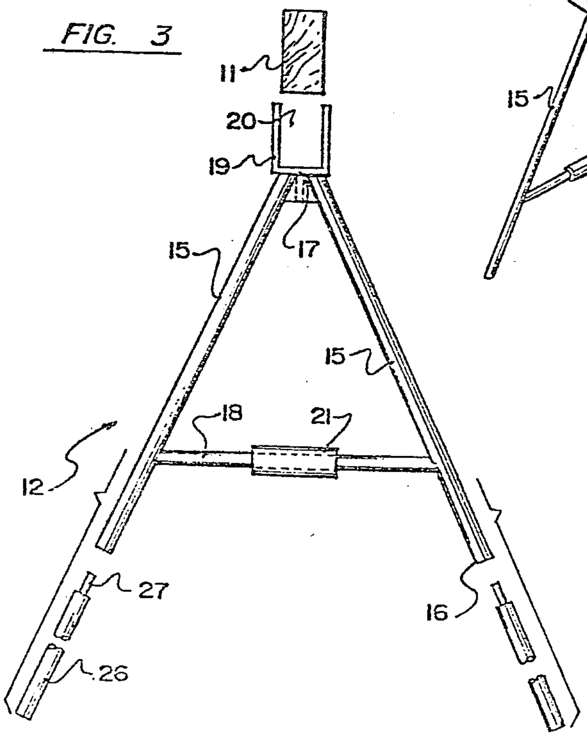
FIG. 3 is an end view of FIG. 1, but also showing leg extensions.
Figure 5:
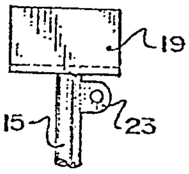
FIG. 5 is a fragmentary side elevation of the upper end of one of the end frames.

Each end component consists of a pair of legs 15 preferably, but not necessarily formed from pipe and having ground or surface engaging lower ends 16. These legs converge from the lower end thereof towards the upper end 17 and are maintained in the substantially "A Frame" configuration by means of a cross member 18 secured to the legs and extending therebetween, intermediate the ends thereof as clearly shown in FIG. 3. The upper ends are maintained in the desired position by the securement thereto of a member engaging means 19 which, in this embodiment, takes the form of a length of channel with the open upper side 20 facing uppermost and with the channels being in alignment one with the other when in the erected position shown in FIG. 4. The frame is preferably made of steel tubing or the like and the channel 19 is preferably welded to the upper ends of legs 15 together with the cross bar 18 which is also preferably welded to the legs 15.

Figure 2:
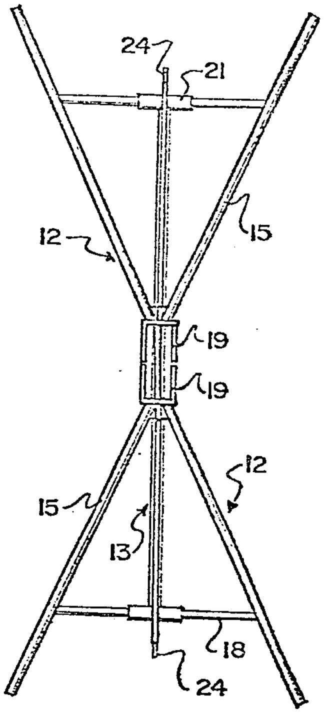
FIG. 2 is a top plan view of the sawhorse frame in the folded position.

The main brace member 13 is also preferably made from a length of tubular material and is provided with cross tubes 21 upon each end thereof extending laterally upon each end of the elongated main portion 22 of the main brace member 13 and these tubes freely engage around the cross members 18 extending between the legs 15 of the ends so that the ends are in effect pivoted to the main brace member 13 as clearly shown. This enables the end components to be folded downwardly upon the main brace member 13 with the upper sides of the channels 19 being substantially in interfacial relationship as clearly shown in FIG. 2 although they may be spaced apart, if desired.

Figure 4:
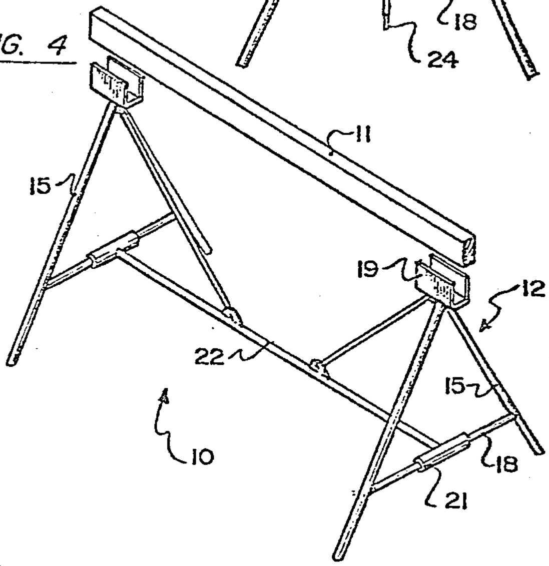
FIG. 4 is an isometric view of FIG. 1.

The end components may also be erected to a position substantially perpendicular to the main brace member 13 as illustrated in FIGS. 1 and 4 under which circumstances they are detachably maintained in this position by means of detachable struts 14. In the present embodiment, these detachable struts which are preferably formed from cylindrical material, are pivotally secured to the main brace member 13 and are detachably secured to the end components adjacent the upper sides thereof. However, it will be appreciated that this configuration can be reserved, if desired.

Figure 6:
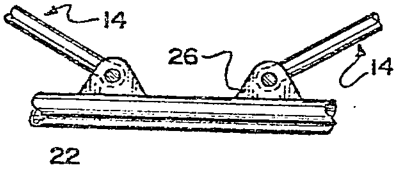
FIG. 6 is a framentary side elevation of part of the main brace member per se.

A pair of lugs 23 are welded or otherwise secured to the underside of the channels 19 between the upper ends of the legs 15 and an eye 24 or other similar aperture, is formed on the upper end of each of the struts 14. When in the erected position shown in FIGS. 1 and 4, a detachable pin or spring clip 25 engages through the apertured lugs 23 and through the eye 24 thus maintaining the struts in the bracing position illustrated. The lower ends of the struts are pivotally connected to lugs 26 secured to and extending upwardly from the elongated portion 22 of the main brace member as shown in FIG. 6. When in the erected position shown in FIG. 1, the cross member 11 may then be slipped into the channels 19 via the open upper sides 20 thereof thus completing the sawhorse assembly. When it is desired to fold the assembly to the position shown in FIG. 2, the spring clips or pins 25 are withdrawn from the lugs 23 and the eye 24 so that the struts 14 may be removed from the end components whereupon the pins or spring clips may be replaced for safe-keeping. The end components are then folded downwardly towards one another so that they lie upon the elongated portion 22 of the main brace member 13 with the struts 14 passing between the legs 15 of each end frame and lying upon the cross bar or member 18 as clearly illustrated in FIG. 2. The frame is then easily transported and stored, if desired, with or without the cross member 11.

If desired, leg extensions 26 may be provided taking the form of short lengths of tubing with reduced upper ends 27 which socket into the lower ends 16 of each of the legs 15 thus permitting adjustment of the height of the sawhorse frame.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A sawhorse frame comprising in combination a pair of end components, member engaging means on the upper end of each of said end components, a main brace member extending between said end components and maintaining same in spaced apart relationship, said main brace member being hingedly connected to said end components whereby said end components can be moved from a folded, upper end to upper end, position upon said brace member, to an erect, spaced and parallel position, one at each end of said brace member and vice versa and detachable struts extending between said end components and said brace member when in the erected position to maintain said sawhorse frame in the erect position, each of said end components including a pair of legs coverging from the lower ends thereof towards an upper apex, and a cross member secured to said legs intermediate the ends thereof, said brace member including an elongated portion and a cross tube on each end of said elongated portion, each cross tube freely engaging around one of said cross members for pivotal action relative thereto.

2. The sawhorse frame according to claim 1 in which said member engaging component comprises an open channel member secured to the upper end of each of said end components with the open side uppermost and in alignment one with the other when erected.

3. The sawhorse frame according to claim 2 in which said detachable struts are each pivotally secured by one end thereof to said frame and detachably pivotally secured by the other end thereof to said frame and extending from adjacent the upper ends of said end component to adjacent the center of said main brace member when in the erected position.

* * * * *